US008849994B2

(12) United States Patent
Roberts et al.

(10) Patent No.: US 8,849,994 B2
(45) Date of Patent: Sep. 30, 2014

(54) METHOD AND APPARATUS TO DETERMINE THE AMOUNT OF DELAY IN THE TRANSFER OF DATA ASSOCIATED WITH A TCP ZERO WINDOW EVENT OR SET OF TCP ZERO WINDOW EVENTS

(75) Inventors: Doug Roberts, McDonough, GA (US); Dan Prescott, Elbert, CO (US); Bruce Kosbab, Colorado Springs, CO (US); Shawn McManus, Colorado Springs, CO (US); Robert Vogt, Colorado Springs, CO (US); John Monk, Larkspur, CO (US); Sean O'Brien, Colorado Springs, CO (US)

(73) Assignee: Fluke Corporation, Everett, WA (US)

( * ) Notice: Subject to any disclaimer, the term of this patent is extended or adjusted under 35 U.S.C. 154(b) by 110 days.

(21) Appl. No.: 13/106,827

(22) Filed: May 12, 2011

(65) Prior Publication Data
US 2012/0290709 A1 Nov. 15, 2012

(51) Int. Cl.
*G06F 15/173* (2006.01)
*H04L 12/26* (2006.01)
*H04L 12/807* (2013.01)
*H04L 12/825* (2013.01)

(52) U.S. Cl.
CPC ............ *H04L 47/27* (2013.01); *H04L 47/266* (2013.01); *H04L 43/50* (2013.01)
USPC ....................................................... 709/224

(58) Field of Classification Search
CPC ........ H04L 47/27; H04L 43/50; H04L 43/067
USPC .................. 370/252; 709/201–253
See application file for complete search history.

(56) References Cited

U.S. PATENT DOCUMENTS

| 6,717,916 | B1* | 4/2004 | Ahn et al. | 370/252 |
| 2001/0049731 | A1* | 12/2001 | Kuusinen et al. | 709/223 |
| 2007/0050479 | A1* | 3/2007 | Yoneda | 709/219 |
| 2007/0130324 | A1* | 6/2007 | Wang | 709/224 |
| 2008/0159287 | A1* | 7/2008 | Nagarajan et al. | 370/392 |
| 2009/0252047 | A1* | 10/2009 | Coffey et al. | 370/252 |
| 2009/0300211 | A1* | 12/2009 | Gallagher et al. | 709/235 |
| 2011/0110230 | A1* | 5/2011 | Zhuang | 370/230 |
| 2011/0113134 | A1* | 5/2011 | Bello et al. | 709/224 |
| 2012/0110620 | A1* | 5/2012 | Kilar et al. | 725/34 |

FOREIGN PATENT DOCUMENTS

EP 1161036 A1 5/2001

OTHER PUBLICATIONS (Kim, Sung-Eun, TCP for Seamless Vertical Handoff in Hybrid Mobile Data Networks, Georgia Institute of Technology, 2003, IEEE, p. 661-665).*
Tompkins (Tompkins, Ray, BU-9 Wireshark Charts & IO Graphs, Jun. 18, 2009, Sharkfest '09 Stanford University, gearbit, p. 1-25).*

(Continued)

*Primary Examiner* — Brian J Gillis
*Assistant Examiner* — Michael A Keller
(74) *Attorney, Agent, or Firm* — Edwards Wildman Palmer LLP; Scott D. Wofsy; Christopher J. Capelli

(57) ABSTRACT

Network monitoring method and apparatus determines the zero window event data transfer delay, reporting the amount of data transfer delay caused thereby. Non-data-transfer-delaying zero window events can be separated from those causing actual delay, allowing reporting of actual delay events separate from non-delay causing events.

8 Claims, 4 Drawing Sheets

(56) References Cited

OTHER PUBLICATIONS

Tompkins (Tompkins, Ray, B-2 Analyzing TCP/IP Networks with Wireshark, Jun. 15, 2010, Sharkfest '10 Stanford University, gearbit, p. 1-37).*

Greer (Greer, Chris, Practical TCP Series—The TCP Window, 2010, LoveMyTool—Open Community for Network Management and Monitoring, p. 1-9).*

Chappel (Chappel, Laura, Analyzing TCP Performance with Wireshark, 2007, Connection Magazine Third Quarter 2007: Jaws of Life, p. 1-4).*

Mathis J Heffner, Pittsburg Supercomputing Center R Raghunarayan Cisco Systems M: "TCP Extended Statistics MIB", rfc4898.txt, May 1, 2007, XP015052438, ISSN: 0000-0003, p. 25, line 13—p. 28, line 27.

* cited by examiner

METHOD AND APPARATUS TO DETERMINE THE AMOUNT OF DELAY IN THE TRANSFER OF DATA ASSOCIATED WITH A TCP ZERO WINDOW EVENT OR SET OF TCP ZERO WINDOW EVENTS

BACKGROUND OF THE INVENTION

This invention relates to networking, and more particularly to determination of data transfer delay that is associated with TCP zero window events.

In a computer networking environment, users may install and deploy monitoring and/or troubleshooting tools for observation of network traffic and network installation and maintenance. The TCP protocol provides a reliable transport mechanism between two machines on a network.

In a TCP data exchange, a receiver advertises a window size representing the amount of information that a machine can receive during a TCP session and accept into the socket connection's receive buffer without dropping data. When a machine initiates a TCP connection to another machine, it will let the other machine know how much data it can receive by the advertised window size. A TCP zero window event is caused when a receiver advertises a zero window size or a window size less than the maximum segment size (MSS), meaning that a receiver (client) is not able to receive further information at the moment. The zero window advertisement notifies the sender (server) to halt TCP transmission to allow the receiver's application to process the information in the socket's receive buffer.

However, not all zero window events result in significant data transmission delay. For example, if the advertised window is less than MSS, but is still larger than the amount of data remaining to be sent, the sender can still send the data rather than In accordance with the prior art, the existence of zero window events has been detected by network monitoring equipment, and reported as zero window events having occurred, but as noted above, the mere occurrence of a zero window event does not necessarily have an impact on data transfer. It would be desirable to know if zero window events were actually having an effect on data transfer and resulting in delay and to know the amount of any such delay, to allow network troubleshooting and analysis to focus on cases where actual impact on network performance was occurring.

SUMMARY OF THE INVENTION

In accordance with the invention, TCP zero window events that may have a delaying effect on data transfer are determined and quantified. The resulting information can be employed to assist in network performance analysis and troubleshooting. Accordingly, improved measurement and reporting of TCP zero window events is provided.

Accordingly, it is an object of the present invention to provide an improved network analysis that determines and reports TCP zero window events that may effect data transfer.

It is a further object of the present invention to provide an improved network monitoring device that measures and reports data transfer delay resulting from TCP zero window events.

It is yet another object of the present invention to provide improved methods of network monitoring and analysis.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

The system according to a preferred embodiment of the present invention comprises a monitoring system and method and an analysis system and method for determining TCP zero window events and resulting transfer data delay.

Figure 1:
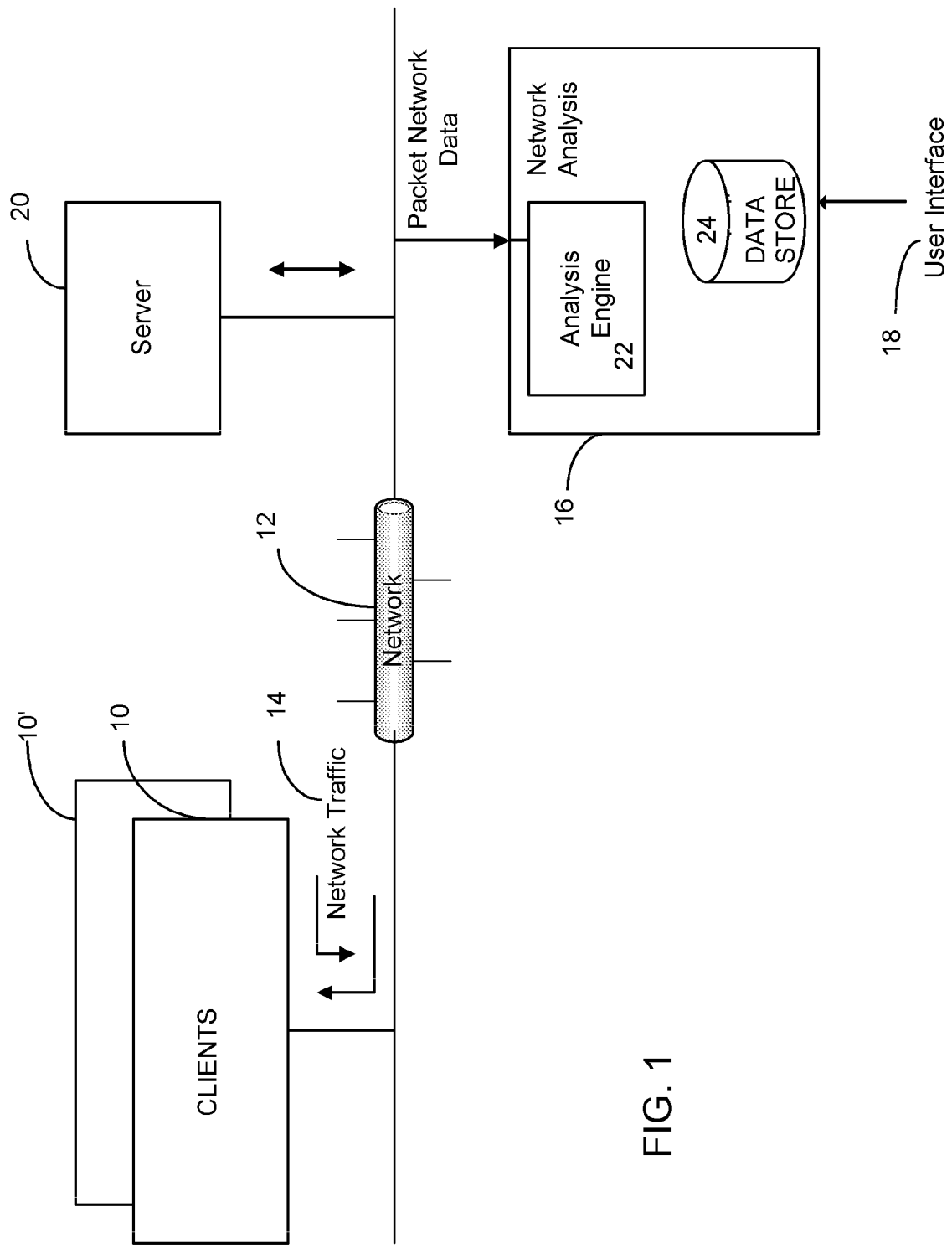
FIG. 1 is a block diagram of a network with a network analysis product interfaced therewith.

Referring to FIG. 1, a block diagram of a network with an apparatus in accordance with the disclosure herein, a network may comprise plural network clients 10, 10', etc., which communicate over a network 12 by sending and receiving network traffic 14 via interaction with server 20. The traffic may be sent in packet form, with varying protocols and formatting thereof.

A network analysis device 16 is also connected to the network, and may include a user interface 18 that enables a user to interact with the network analysis device to operate the analysis device and obtain data therefrom, whether at the location of installation or remotely from the physical location of the analysis product network attachment.

The network analysis device comprises hardware and software, CPU, memory, interfaces and the like to operate to connect to and monitor traffic on the network, as well as performing various testing and measurement operations, transmitting and receiving data and the like. When remote, the network analysis device typically is operated by running on a computer or workstation interfaced with the network.

The analysis device comprises an analysis engine 22 which receives the packet network data and interfaces with data store 24.

Figure 2:
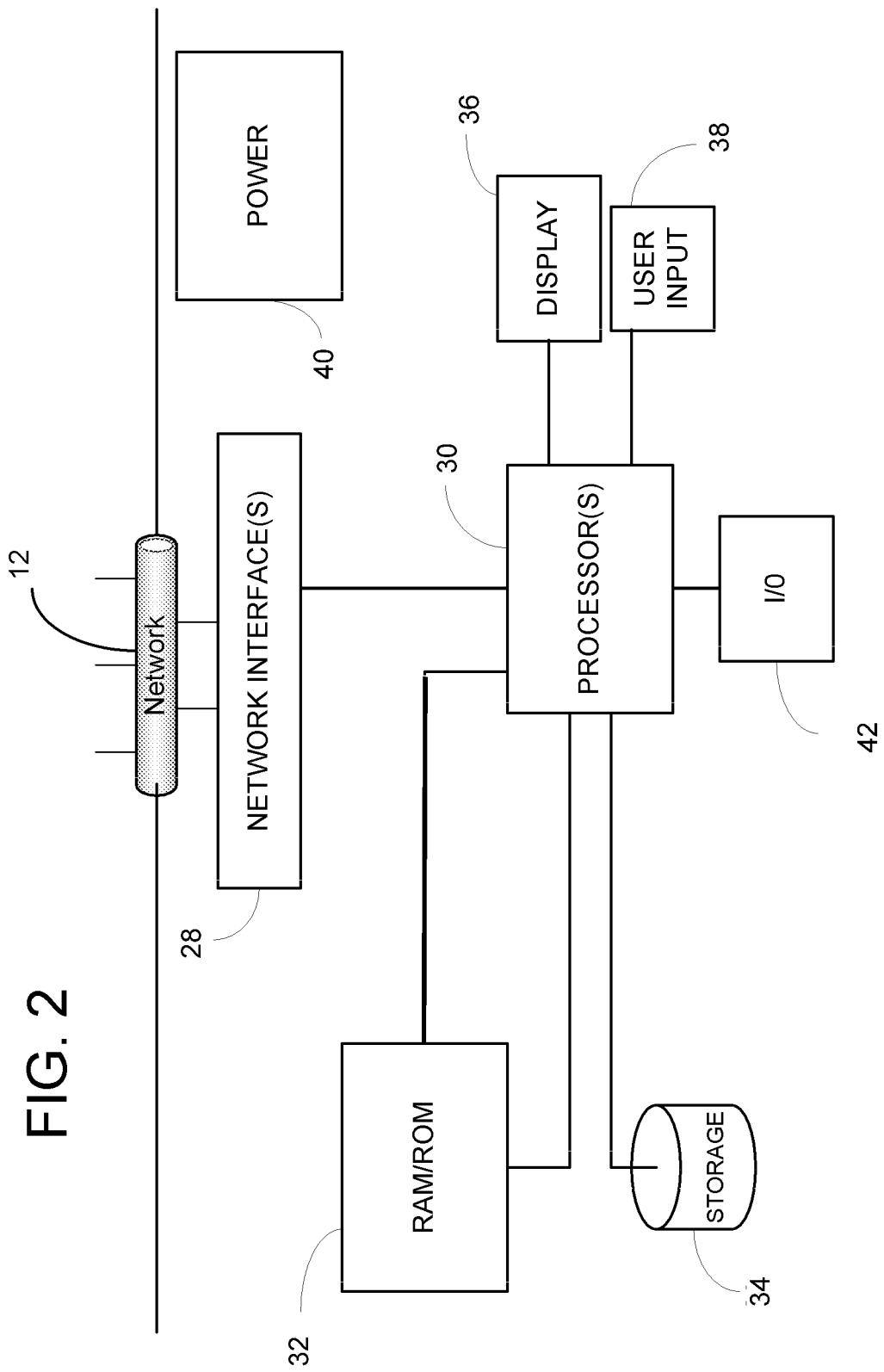
FIG. 2 is a block diagram of a monitor device for determining the amount of data outstanding throughout the life of a TCP flow.

FIG. 2 is a block diagram of a test instrument/analyzer 26 via which the invention can be implemented, wherein the instrument may include network interfaces 28 which attach the device to a network 12 via multiple ports, one or more processors 30 for operating the instrument, memory such as RAM/ROM 32 or persistent storage 34, display 36, user input devices (such as, for example, keyboard, mouse or other pointing devices, touch screen, etc.), power supply 40 which may include battery or AC power supplies, other interface 42 which attaches the device to a network or other external devices (storage, other computer, etc.).

In operation, the network test instrument is attached to the network, and observes transmissions on the network to collect data and analyze and produce statistics thereon and to determine the TCP zero window events and their effect on data transfer delay.

Figure 3:
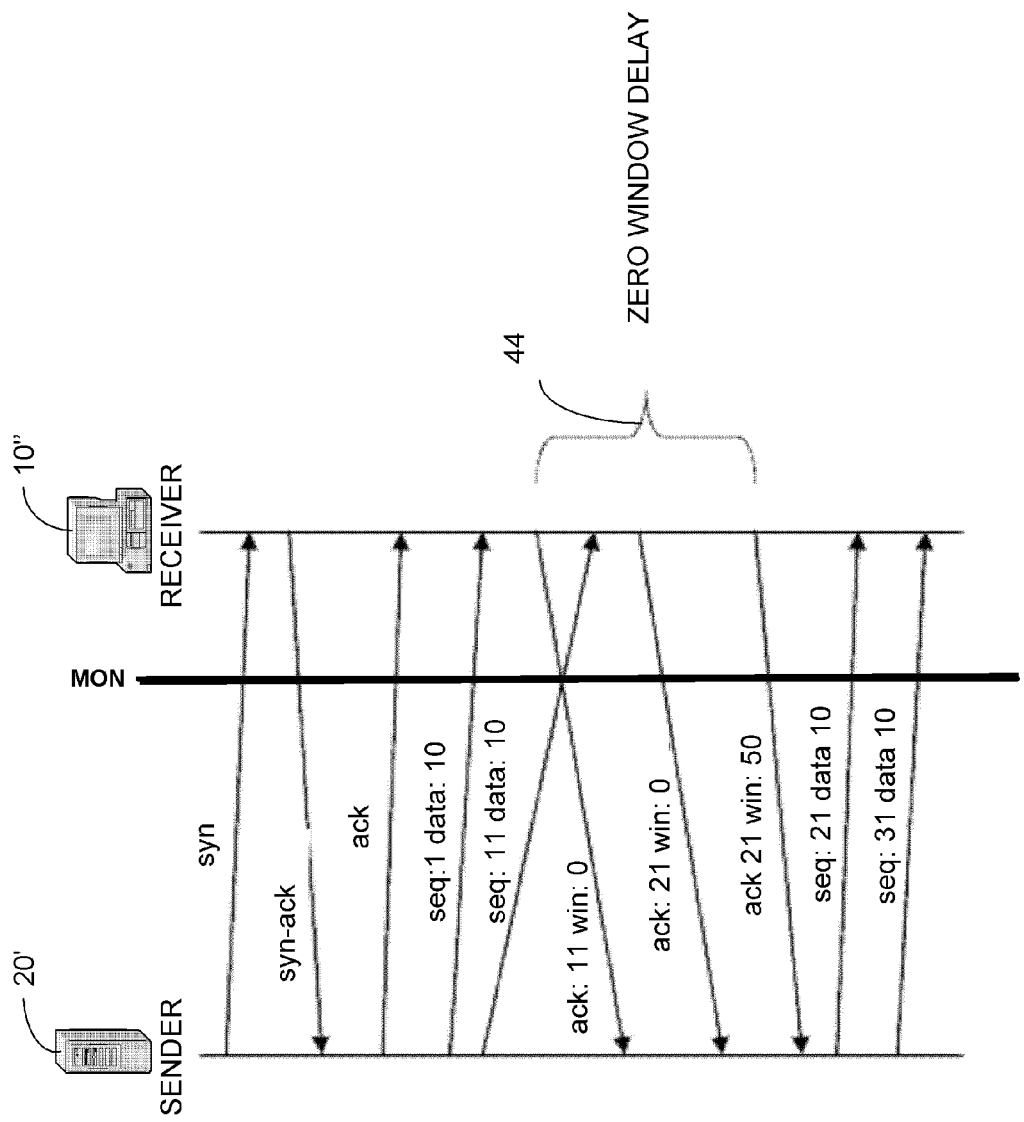
FIG. 3 is a flow diagram illustrating an example of data transmissions with TCP zero window delay.

FIG. 3 is a flow diagram illustrating an example of data transmissions with TCP zero window delay, wherein two devices SERVER 20' (sender) and CLIENT 10" (receiver) are exchanging data. The transfer begins with SERVER and CLI- ENT exchanging SYN, SYN-ACK and ACK to establish a connection. CLIENT would have at this point in this example, advertised a window greater than 20. SERVER then sends sequence 1 with 10 segments of data and sequence 11 with 10 segments of data. After having received sequence 1, CLIENT acknowledges receiving the 10 segments of data (ack: 11) but also advertises a window size 0 (win: 0), which starts a potential zero window delay event 44. CLIENT then acknowledges the second sequence of data (seq: 11) by sending ack: 21, but still is advertising zero window (win: 0), so the potential zero window event is continuing. Eventually, CLIENT sends ack 21 with a window size of 50 (ack: 21 win: 50 which signals the end of the potential zero window delay.

Next, SERVER resumes data transmission with seq: 21 data: 10, which implies that SERVER was waiting to send further data, so the zero window event can be classified as having caused delay, and accordingly the time of delay may be measured and reported as zero window delay. A subsequent data sequence is also illustrated in the example (seq: 31 data: 10).

If the case had been that no further data sequences were sent from SERVER, it would be determined that no data transfer delay had resulted from that zero window event, so no resulting zero window delay is reported.

Figure 4:
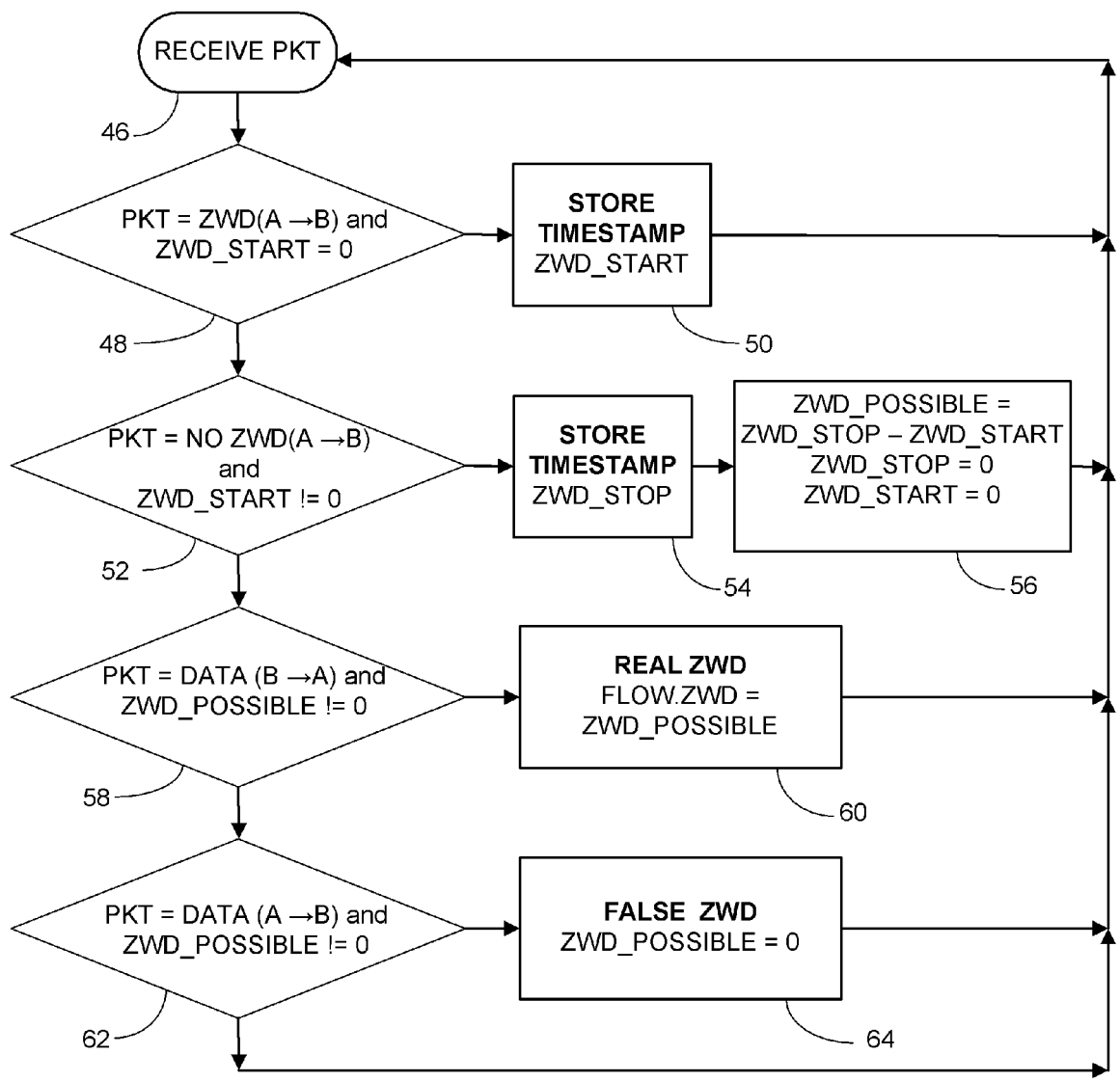
FIG. 4 is a flow chart of steps in determination of amount of TCP zero window events and data transfer delay associated with said events.

FIG. 4 is a flow chart of steps in determination of TCP zero window events and zero window delay related thereto. These steps are suitably performed by a network test instrument or monitoring system. A number of stateful values and flags are employed in the process:

zwd(A→B)—whether a zero window has been advertised on a transfer from station A to station B zwd_start—a time stamp of the time that a possible zero window event started, initially set to zero zwd_stop—a time stamp of the time that a possible zero window event ended, initially set to zero no zwd(A→B) indicates a zero window is not currently advertised zwd_possible—a calculated time determination of a possible zero window delay, initially zero data(B→A) or data(A→B)—an indication that a packet being analyzed is a data sequence from B to A or from A to B flow.zwd—reported value of determined zero window delay When the process starts, a packet is received at block 46, decision block 48 examines whether the packet is a zero window advertisement (meaning advertised window size is zero or below maximum segment size (MSS)) from A to B and whether zwd_start is zero. If so, the current time is stored in zwd_start at block 50, indicating the starting time of a possible zero window data delay event. Processing continues at 46 for receiving a next packet.

If the determination at decision block 48 is false, decision block 52 is performed, wherein it is determined if the packet is a 'not zero window' advertised packet from A to B and zwd_start is not equal to zero (meaning an advertised window has appeared that is not a zero window and a time value had previously been stored in zwd_start). If decision block 52 results in true, block 54 stores a time stamp in zwd_stop, the end time of a possible zero window event, followed by block 56 which computes the value of zwd_possible to be zwd_stop minus zwd_start, giving an elapsed time between the start and stop time of the possible zero window delay. The two values zwd_stop and zwd_start are reset to zero and processing continues to block 46 to receive the next packet. Zwd_possible contains the value that could be the zero window delay value, but the next packet of data must be analyzed (by decision blocks 58 and 62 discussed below) to determine whether actual delay has taken place.

If the result at block 52 is false, decision block 58 is entered, wherein it is determined whether the received packet is a data packet from B to A and if zwd_possible was not equal to zero (meaning that data transmission has started again and a potential zero window delay time had been calculated). If true, this confirms that the possible zero window delay was an actual delay, because B was delaying sending data to A, so block 60 stores the delay time in a variable flow.zwd, which can be passed on for further analysis, aggregation, storage, and reporting or use in analysis of zero window delay by other processes or devices. Processing then continues at 46 to monitor further packets.

If the result of decision block 58 was false, decision block 62 checks if the packet was a data packet from A to B and whether zwd_possible was not zero. If true, this indicates that the zero window event had no apparent delay effect on data transfer, because B was apparently not waiting to send data to A, so zwd_possible is set to zero in block 64, indicating that it was a false zero window delay event. Processing continues to 46 for further packet monitoring.

If the result of decision block 62 is false, processing continues to 46 for further packet monitoring.

Potentially, multiple zero window advertisements could occur before the end of a zero window event is detected, and the above process accommodates this situation, where a receiver advertises zero window multiple times (as in the example of FIG. 3, ack:11 win: 0 is followed by a subsequent ack: 21 win: 0 before the end of the zero window event with ack: 21 win: 50).

While the example above illustrates delayed data transmission from a server to a client, the system, method and apparatus are employable for determining zero window delay in a full duplex connection between any TCP communicating stations.

In accordance with the above, the method and apparatus provides a determination of whether a zero window event had a delaying effect on data transfer, and if so, provides a measurement of the amount of delay. This determination provides useful information to assist in network troubleshooting, analysis and maintenance, so that zero window events that affect data transfer may be reported for further investigation, while those zero window events that have no likely delaying effect may be filtered out. The method and apparatus can accordingly measure the impact that either endpoint of a transaction is having, whoever is the receiver, on transfer of data, independent of network delays not related to receiver caused delays. This information can be used for other processing and analysis in network monitoring.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of monitoring network zero window events via an interface connection to a network for observing traffic, comprising:
    determining a zero window event advertised by a receiver;
    determining whether a sender withheld data transmission until the end of the zero window event;
    determining whether the zero window event caused said data transmission to be withheld; and reporting a duration of a zero window delay only when it is determined the sender withheld said data transmission until the end of the zero window event.

2. The method according to claim 1, further comprising: determining a start time of the zero window event from a receiver, and determining an end time of the zero window event.

3. The method according to claim 2, wherein said reporting a duration of a zero window delay comprises determining the amount of time between said start time and end time.

4. The method according to claim 2, wherein said determining whether a zero window event caused said data transmission to be withheld comprises determining whether a subsequent transmission after said end time was a data transmission delayed during said time between said zero window start time and said zero window end time.

5. A network test instrument for determining zero window delay, comprising: a network interface for observing network traffic; and
   a processor, said processor including employing observed network traffic to:
      determine a start time of a zero window event advertisement from a receiver;
      determine an end time of the zero window event;
      determine whether a sender withheld data transmission until the end of the zero window event;
      determine whether the zero window event caused said data transmission to be withheld; and
      report a duration of a zero window delay only when it is determined the sender withheld said data transmission until the end of the zero window event.

6. A network test instrument according to claim 5, wherein said processor determines whether the zero window event caused said data transmission to be withheld by determining whether a subsequent transmission after said end time was a data transmission that was delayed between said zero window start time and said zero window end time and wherein said processor reports a duration of the zero window delay by:
   determining the amount of time between said start time and end time; and
   if said determining whether a subsequent transmission after said end time was a data transmission that was delayed results in a determination of delay, reporting the duration of the zero window delay based on said determined amount of time between said start time and end time.

7. A system for determining zero window delay, comprising:
   a network monitor for observing network traffic at a first location on a network; and
   a processor at a second location on the network different from said first location, said processor including employing observed network traffic to:
      determine a start time of a zero window event advertisement from a receiver,
      determine an end time of the zero window event;
      determine whether a sender withheld data transmission until the end of the zero window event;
      determine whether the zero window event caused said data transmission to be withheld; and
      report a duration of a zero window delay only when it is determined the sender withheld said data transmission until the end of the zero window event.

8. A system test instrument according to claim 7, wherein said processor determines whether the zero window event caused said data transmission to be withheld by determining whether a subsequent transmission after said end time was a data transmission that was delayed between said zero window event start time and said zero window event end time; and if said determining whether a subsequent transmission after said end time was a data transmission that was delayed results in a determination of delay, said processor reports the zero window delay based on an amount of time between said start time and end time.

* * * * *